(12) United States Patent
Ramme et al.

(10) Patent No.: US 7,390,444 B2
(45) Date of Patent: Jun. 24, 2008

(54) CARBON DIOXIDE SEQUESTRATION IN FOAMED CONTROLLED LOW STRENGTH MATERIALS

(75) Inventors: Bruce W. Ramme, Okauchee, WI (US); Bryna D. Goeckner, Whitefish Bay, WI (US); Joshua J. Russart, Dousman, WI (US)

(73) Assignee: Wisconsin Electric Power Company, Milwaukee, WI (US)

( * ) Notice: Subject to any disclaimer, the term of this patent is extended or adjusted under 35 U.S.C. 154(b) by 503 days.

(21) Appl. No.: 11/064,756

(22) Filed: Feb. 24, 2005

(65) Prior Publication Data
US 2006/0185560 A1    Aug. 24, 2006

(51) Int. Cl.
*B29B 17/00* (2006.01)
(52) U.S. Cl. .......................... 264/37.14; 264/42; 264/50
(58) Field of Classification Search .................. 264/42, 264/50, 37.14; 106/705, 707
See application file for complete search history.

(56) References Cited

U.S. PATENT DOCUMENTS

| | | | |
|---|---|---|---|
| 109,669 A | 11/1870 | Rowland | |
| 128,980 A | 7/1872 | Rowland | |
| 591,168 A | 10/1897 | Heinzerling | |
| 1,449,696 A | 3/1923 | Pike | |
| 1,966,419 A | 7/1934 | Pontoppidan | |
| 1,966,864 A | 7/1934 | Knibbs | |
| 3,867,159 A | 2/1975 | Ergene | |
| 4,069,063 A | 1/1978 | Ball | |
| 4,093,690 A | 6/1978 | Murray | |
| 4,117,060 A | 9/1978 | Murray | |
| 4,350,567 A | 9/1982 | Moorehead et al. | |
| 4,362,679 A | 12/1982 | Malinowski | |
| 4,374,672 A | 2/1983 | Funston et al. | |
| 4,383,862 A | 5/1983 | Dyson | |
| 4,407,676 A | 10/1983 | Restrepo | |

(Continued)

FOREIGN PATENT DOCUMENTS

CH    644828    8/1984

(Continued)

OTHER PUBLICATIONS

ASTM C 618, "Standard Specification for Fly Ash and Raw or Calcined Natural Pozzolan for Use as a Mineral Admixture in Portland Cement Concrete", 1999.

(Continued)

*Primary Examiner*—Suzanne E. McDowell
(74) *Attorney, Agent, or Firm*—Quarles & Brady LLP

(57) ABSTRACT

A process for sequestering carbon dioxide from the flue gas emitted from a combustion chamber is disclosed. In the process, a foam including a foaming agent and the flue gas is formed, and the foam is added to a mixture including a cementitious material (e.g., fly ash) and water to form a foamed mixture. Thereafter, the foamed mixture is allowed to set, preferably to a controlled low-strength material having a compressive strength of 1200 psi or less. The carbon dioxide in the flue gas and waste heat reacts with hydration products in the controlled low-strength material to increase strength. In this process, the carbon dioxide is sequestered. The CLSM can be crushed or pelletized to form a lightweight aggregate with properties similar to the naturally occurring mineral, pumice.

23 Claims, 3 Drawing Sheets

U.S. PATENT DOCUMENTS

| | | | |
|---|---|---|---|
| 4,415,366 A | | 11/1983 | Copening |
| 4,427,610 A | | 1/1984 | Murray |
| 4,872,913 A | | 10/1989 | Dunton et al. |
| 4,900,359 A | | 2/1990 | Gelbman |
| 5,013,157 A | | 5/1991 | Mills et al. |
| 5,051,217 A | | 9/1991 | Alpar et al. |
| 5,307,876 A | | 5/1994 | Cowan et al. |
| 5,397,553 A | | 3/1995 | Spencer |
| 5,435,843 A | | 7/1995 | Roy et al. |
| 5,518,540 A | | 5/1996 | Jones, Jr. |
| 5,650,562 A | | 7/1997 | Jones, Jr. |
| 5,654,352 A | | 8/1997 | MacDonald |
| 5,690,729 A | | 11/1997 | Jones, Jr. |
| 5,897,704 A | | 4/1999 | Baglin |
| 5,918,429 A | | 7/1999 | Hicks et al. |
| 5,951,751 A | | 9/1999 | Williams et al. |
| 5,965,201 A | | 10/1999 | Jones, Jr. |
| 6,153,005 A | | 11/2000 | Welker et al. |
| 6,162,839 A | * | 12/2000 | Klauck et al. .................. 521/83 |
| 6,235,092 B1 | | 5/2001 | Spencer |
| 6,264,736 B1 | | 7/2001 | Knopf et al. |
| 6,334,895 B1 | * | 1/2002 | Bland ......................... 106/705 |
| 6,352,576 B1 | | 3/2002 | Spencer et al. |
| 6,372,023 B1 | | 4/2002 | Kiyono et al. |
| 6,387,174 B2 | | 5/2002 | Knopf et al. |
| 6,461,424 B1 | | 10/2002 | Ramme et al. |
| 6,521,021 B1 | | 2/2003 | Pennline et al. |
| 6,569,388 B1 | | 5/2003 | Fan et al. |
| 6,648,949 B1 | | 11/2003 | Der et al. |

FOREIGN PATENT DOCUMENTS

| | | |
|---|---|---|
| DE | 4207235 A1 | 9/1993 |
| JP | 2-18368 | 1/1990 |
| JP | 6-263562 | 9/1994 |

OTHER PUBLICATIONS

American Concrete Institute Committee 229, "Controlled Low-Strength Materials", ACI 229R-99, pp. 229R-1 to 229R-15, Jun. 1999.

* cited by examiner

Fig. 2 - Compressive Strength of Foamed-CLSM Mixtures

CARBON DIOXIDE SEQUESTRATION IN FOAMED CONTROLLED LOW STRENGTH MATERIALS

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This invention relates to a process for sequestering carbon dioxide through the production of lightweight controlled low-strength materials.

2. Description of the Related Art

Man made carbon dioxide ($CO_2$) has been viewed by some as being a pollutant. There are many sources of $CO_2$ including power plants, cement manufacturing, vehicles, natural gas ensuing from wells, ammonia manufacturing, fermentation, hydrogen production (e.g., in oil refining), and producing hydrogen fuels from carbon-rich feedstocks, such as natural gas, coal, and biomass. Thus, there has been interest in processes for sequestering carbon dioxide.

Permanent sequestration of carbon dioxide can occur by terrestrial ecosystems. For example, in forests and trees, 74,806 metric tons of carbon dioxide can be sequestered per 1,000-acre plantation in seven years. Also, grasses and prairies, such as the United States Great Plains, sequester 740 kg/ha/year. Agricultural and biomass croplands, boreal wetlands and peatlands in United States agricultural lands sequester carbon dioxide at rates of 75-200 million metric tons per year.

Permanent sequestration of $CO_2$ can also occur by advanced chemical and biological sequestration wherein $CO_2$ is converted into either commercial products that are inert and long lived or that are stable solid compounds. Examples include: magnesium carbonate, $CO_2$ ice-like material, advanced catalysts for $CO_2$ and CO conversion, engineered photosynthesis systems, non-photosynthetic mechanisms for $CO_2$ fixation (methanogenesis and acetogenesis), genetic manipulation of agriculture and forests to enhance $CO_2$ sequestering potential, advanced decarbonization systems, and biomimetic systems.

Permanent sequestration of carbon dioxide also occurs by the natural carbonation of concrete. About 0.2 pounds of carbon dioxide is absorbed per 1 pound of cement in concrete over time. During a typical year of concrete construction in the United States, 274,000 metric tons of atmospheric $CO_2$ are absorbed. Over a 100-year period, all of the concrete produced during a single typical year will absorb 2,906,000 metric tons.

Various methods are known for storing carbon dioxide in geological media such as enhanced oil recovery, storage in depleted oil and gas reservoirs, replacement of methane by carbon dioxide in deep coal beds, injection into deep saline aquifers, and storage in salt caverns. Also, ocean sequestration of carbon dioxide is known. Carbon dioxide may be stored underwater in large canyons or injected directly into the deep ocean, via pipeline or tanker. Furthermore, oceans naturally sequester carbon dioxide. It has also been proposed to capture carbon dioxide by microalgae, ocean fertilization, or non-biological capture from the air.

Of course, various methods for reducing carbon dioxide production are also known. For example, power plant efficiency can be increased by way of: (i) processes, such as flue gas separation, oxy-fuel combustion, and pre-combustion separation, and (ii) systems, such as solvents (chemical, physical, and hybrid systems), membranes, cryogenic separation, solid-bed adsorbents, and combined systems. Carbon dioxide production can also be reduced by decreased manufacturing of cement through use of alternatives to cement like fly ash. Decreased use of vehicles can also reduce carbon dioxide production.

It has been reported that in 2000, carbon dioxide emissions reached 5.8 billion metric tons and that approximately 80% of annual emissions come from the burning of fossil fuels. Therefore, there have been efforts to limit man made carbon dioxide emissions from fossil fuel burning plants. U.S. Pat. No. 6,235,092 provides a discussion of a variety of processes that have been developed for removing a gaseous component (such as carbon dioxide) from a multicomponent gaseous stream (such as the exhaust gas stream of a coal burning electrical power generation plant). Selective adsorption by solid adsorbents and gas absorption are named as two example processes. This patent further mentions that gas absorption finds use in the separation of $CO_2$ from multicomponent gaseous streams. It is reported that in some $CO_2$ gas absorption processes, the following steps are employed: (1) absorption of $CO_2$ from the gaseous stream by a host solvent such as monoethanolamine; (2) removal of $CO_2$ from the host solvent by steam stripping; and (3) compression of the stripped $CO_2$ for disposal such as by sequestration through deposition in the deep ocean or ground aquifers. Other patents describing $CO_2$ sequestration methods include U.S. Pat. Nos. 6,648,949, 6,372,023 and 5,397,553.

Although these processes may be successful in-sequestering carbon dioxide, they can be energy intensive. Thus, there is continued interest in the development of less energy intensive processes for sequestering carbon dioxide from the exhaust gas streams of industrial and power generation plants.

It is also known that fly ash is a voluminous by-product of coal burning electrical power generation plants, presenting a possible environmental disposal issue as a portion of this fly ash may be relegated to land fill. This is a less than desirable solution from an environmental viewpoint. Thus, alternative uses for fly ash have been proposed. For example. U.S. Pat. Nos. 6,461,424, 5,951,751 and 4,374,672 disclose the use of fly ash in controlled low-strength materials (CLSM). Controlled low-strength materials are described in the publication "Controlled Low-Strength Materials", reported by American Concrete Institute Committee 229, June 1999, as self-compacted, cementitious materials used primarily as a backfill in place of compacted fill. Conventional CLSM mixtures usually consist of water, portland cement, fly ash, and fine or coarse aggregates. Some CLSM mixtures consist of water, portland cement and fly ash. This publication also defines CLSM as a material that results in a compressive strength of 8.3 MPa (1200 psi) or less at the conventional 28 day testing period (typically without compaction), and notes that most current CLSM applications require unconfined compressive strengths of 2.1 MPa (300 psi) or less at the conventional 28 day testing period in order to allow future excavation. Thus, the use of fly ash in CLSM provides an environmentally beneficial use for fly ash.

It is also known that the density of cement-containing materials can be lowered by entraining gas in the materials.

For example, U.S. Pat. No. 3,867,159 describes cellular concrete structures made by mixing water and cement followed by the introduction of a foam produced by a foam generator. U.S. Pat. No. 4,383,862 discloses a method of producing aerated concrete wherein a gas such as air, carbon dioxide, or a mixture thereof is introduced into a blender with a mortar mix. U.S. Pat. No. 5,654,352 describes air-entraining agents for use in cementitious mixtures having fly ash. Some of these mixtures are reported as being controlled low-strength materials. U.S. Pat. Nos. 6,153,005, 5,013,157, 4,900,359, 4,415,366 and 4,407,676 describe related processes.

It is also known that the hardening of cement-containing materials can be accelerated by carbonation in which calcium hydroxide in the cement is transformed into calcium carbonate by absorbing carbon dioxide. Related processes are described in U.S. Pat. Nos. 6,387,174, 6,264,736, 5,965,201, 5,897,704, 5,690,729, 5,650,562, 5,518,540, 5,307,876, 5,051,217, 4,427,610, 4,362,679, 4,350,567, 4,117,060, 4,093,690 and 4,069,063, German patent application DE 4207235, Swiss patent application CH 644828, and Japanese patent applications JP 6263562 and JP 2018368.

Because carbon dioxide and fly ash are produced as by-products of coal burning power plants, there is a continuing need for products and processes that make environmentally beneficial use of these by-products.

SUMMARY OF THE INVENTION

The foregoing needs are met by a process according to the invention for sequestering carbon dioxide from the flue gas emitted from a combustion chamber such as that included in a coal burning power plant. In the process, a foam including a foaming agent and the flue gas is formed, and the foam is added to a mixture including a cementitious material (e.g., fly ash) to form a foamed mixture. Thereafter, the foamed mixture is allowed to set, preferably to a controlled low-strength material having a compressive strength of 1200 psi or less.

In the process, the normal air used in producing the foam is replaced with carbon dioxide and flue gas generated from electric power plants. The carbon dioxide in the flue gas reacts with hydration products in the controlled low-strength material which in turn sequesters the carbon dioxide. In a typical material, carbonation occurs at the surface, where the material is exposed to a source of carbon dioxide, for example from air, and slowly penetrates further in depth. In contrast, lightweight foamed controlled low-strength materials are particularly suitable to increase the surface area exposed to carbon dioxide. In the foamed controlled low-strength material of the present invention, there are millions of air bubbles that contain carbon dioxide, so there can be an almost unlimited amount of surface area of controlled low-strength material where carbonation may occur. In the process, the compressive strength of the controlled low-strength material increases due to the carbonation. Also advantageously, the man made carbon dioxide emissions from a fossil fuel burning plant are decreased by sequestration of the carbon dioxide in the controlled low-strength material.

Carbonation occurs when part of the calcium hydroxide formed during hydration of cementitious materials, such as portland cement and/or fly ash, combines in the course of hardening with the carbon dioxide and produces calcium carbonate in the following chemical reaction.

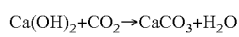

Class C fly ash is produced normally from lignite and sub-bituminous coals and usually contains a significant amount of calcium hydroxide $Ca(OH)_2$. When a controlled low-strength material mixture of Class C fly ash and water is used, the fly ash provides a sufficient source of calcium hydroxide needed for the carbonation reaction to occur, and for concurrently increasing the compressive strength of the controlled low-strength material.

It should be appreciated that the process of the invention is not limited to sequestering carbon dioxide from the flue gas emitted from a combustion chamber. The process may be used to sequester carbon dioxide from other mixed gases including carbon dioxide.

It is therefore an advantage of the present invention to provide products and processes that make environmentally beneficial use of the carbon dioxide and fly ash produced as by-products of coal burning power plants.

These and other features, aspects, and advantages of the present invention will become better understood upon consideration of the following detailed description, drawings, and appended claims.

DETAILED DESCRIPTION OF THE INVENTION

Figure 1:
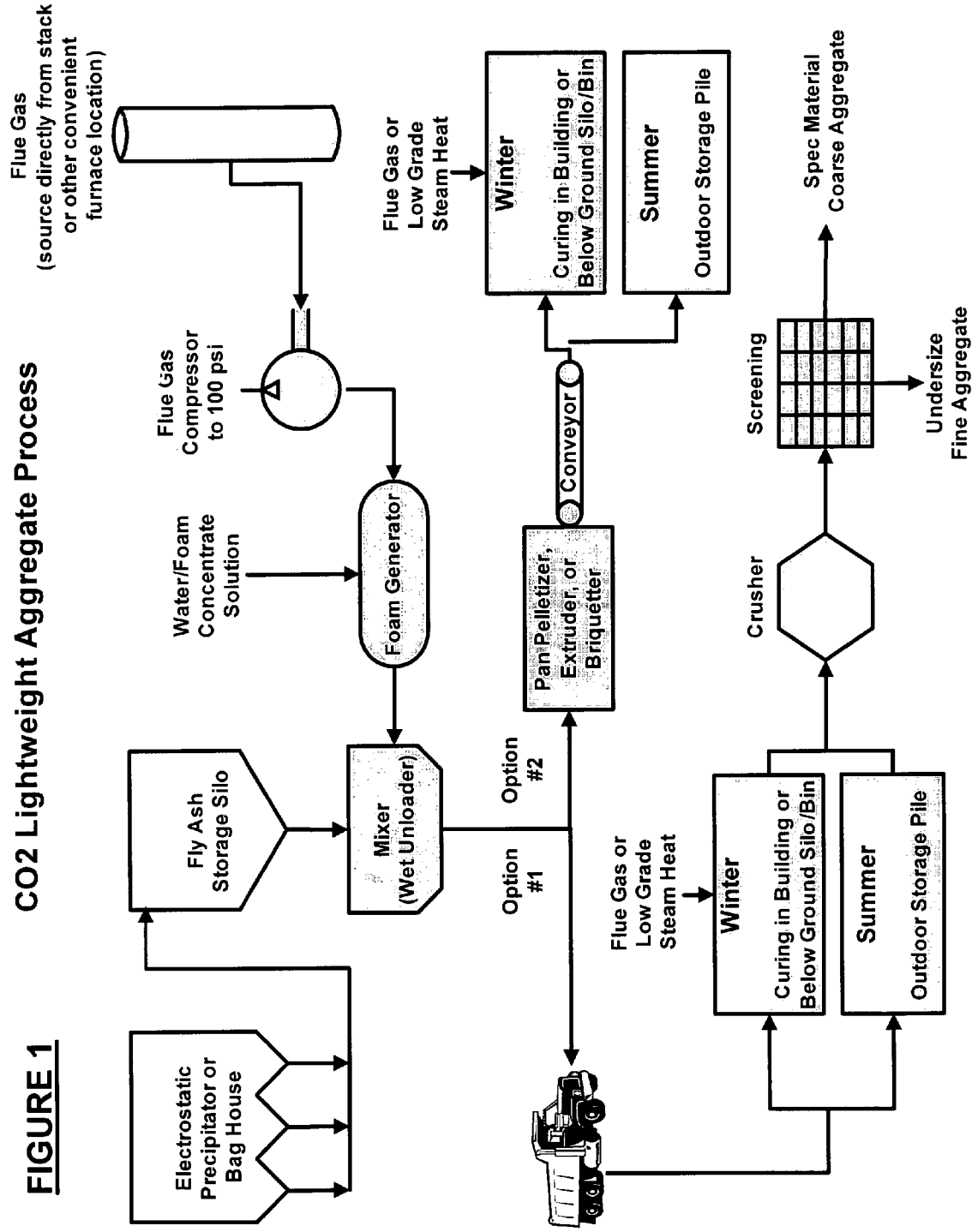
FIG. 1 is a schematic showing an example process according to the invention.

Turning to FIG. 1, there is shown an example process according to the invention. In a first step, flue gas is removed from a combustion chamber such as that of a coal-fired power plant. The flue gas source may be an exhaust stack or other convenient furnace location where flue gas is emitted from the combustion chamber. While the example process is typically used in the context of flue gas generated by a coal-fired power plant, it is not limited to such applications.

In general, coal-fired power plant flue gas may include fly ash, nitrogen, oxygen, carbon dioxide, nitrogen oxides, water, carbon monoxide, sulfur oxides, mercury, and various acid gases. The precise composition of the flue gas is determined by the nature of the process generating the flue gas and can vary significantly in time. In studies reported in U.S. Pat. No. 6,521,021, the United States Combustion Environmental Research Facility operates a pulverized coal combustion unit that simulates the firing of a utility power plant and that produces a simulated flue gas containing 16% carbon dioxide, 5% oxygen, 2000 ppm sulfur dioxide, 500 ppm nitric oxide, 270 ppb elemental mercury, and the remainder nitrogen.

In a second step of the process of the invention, the flue gas is fed via a conduit to a compressor where the flue gas is compressed to a higher pressure. One example pressure after compression is 100 psi, although the invention is not limited to that pressure.

Still referring to FIG. 1, the compressed flue gas is then fed via a conduit to a foam generator. A typical foam generator will include an input for water, an input for a foaming agent, and an input for the compressed flue gas which arrives via the conduit from the compressor. Foam generators are commercially available, and example suppliers include Elastizell Corporation of America, Ann Arbor, Mich., USA, and Cellular Concrete LLC, Roselle Park, N.J., USA. The foaming agent is typically a soap or a surfactant. Foaming agents are also commercially available, and one example supplier is Elastizell. Another example supplier is Cellular Concrete LLC, which sells aqueous surface-active polypeptide-alkylene polyol condensate foaming agents under the trade names Mearlcrete® and Geofoam™.

The foam generator mixes the water and the foaming agent in a selectable ratio to form a pre-foaming solution. The compressed flue gas and the pre-foaming solution are then fed through an exit conduit of the foam generator which creates a foam by expansion of the pre-foaming solution with the gas. By "foam" herein, we mean a dispersion of gas in a liquid solution. The flue gas globules may be of any size from colloidal to macroscopic. The pre-foaming solution must have sufficient cohesion to form an elastic film. While the preferred foam generator produces a mechanical foam (i.e., a foam produced by mixing gas with water containing a foaming agent), chemical foams (i.e., foams produced by a chemical reaction that produces gas) could supplement the mechanical foam. The foam generator may be specially manufactured to handle a large scale process. The use of the generated foam will be described further below.

Referring still to FIG. 1, in a separate process step, fly ash and other particulates are removed from the flue gas. Fly ash is a particulate material collected from the flue gases, of stationary combustion sources, such as coal, oil, or municipal solid waste burning power plants. It generally comprises a very fine dust with particles mostly in the silt to clay size ranges. The physical and chemical properties of fly ash vary according to the combustion source, depending on the source of fuel, burning and handling processes, and also the addition of materials both prior to and subsequent to combustion (such as nitrogenous NOx reducing treatment agents), as well as the addition of materials to aid in the fly ash collection process.

The principle constituents of fly ash are silica (silicon dioxide, $SiO_2$), alumina (aluminum oxide, $Al_2O_3$), calcium oxide (CaO), and iron oxide (FeO). As is well known, the actual composition of fly ash can vary widely. In addition to those compositions detailed above, common combustion fly ashes also contain other components, as well as unburned carbon. Generally, fly ashes have a specific gravity which can range between about 2.1 and about 2.6. Most of the particles of fly ash are glassy spheres, except for the carbon particles, which are somewhat larger and more angular than the inorganic particles. Fly ash particles generally have an average size which can range from less than about 1.0 to about 80 microns in diameter, more commonly between about 1.0 and about 30.0 microns in diameter. See American Society for Testing and Materials ASTM C 618, "Standard Specification for Fly Ash and Raw or Calcined Natural Pozzolan for Use as a Mineral Admixture in Portland Cement Concrete" for detailed specifications of fly ash. In the present invention, Class C fly ash is particularly advantageous as it usually contains a significant amount of calcium oxide CaO.

The fly ash is carried along with the flue gases. In order to prevent the fly ash from being emitted to the atmosphere, the fly ash is collected in the present process by a conventional apparatus such as an electrostatic precipitator or a bag house, or like means. The ash is then transported to a fly ash storage silo, preferably configured with sufficient height to allow for gravity feed. A maintenance gate may close the bottom of the fly ash storage silo to halt the flow of fly ash. Alternatively, the fly ash storage silo may be replaced by a feed directly from equipment that is collecting the fly ash from the flue gases.

In a next process step of FIG. 1, fly ash from the fly ash storage silo, foam from the foam generator and water are combined in a mixer (wet unloader) to form a foamed mixture. Various foamed mixtures of the fly ash, foam and water are possible. In one example, the foamed mixture of fly ash, foam and water includes 700 to 1700 pounds of fly ash per cubic yard of the foamed mixture and 100 to 900 pounds of water per cubic yard of the foamed mixture. In another example, the foamed mixture includes 1000 to 1400 pounds of fly ash per cubic yard of the foamed mixture and 300 to 700 pounds of water per cubic yard of the foamed mixture. In yet another example, the foamed mixture includes 1 to 100 cubic feet of foam per cubic yard of the foamed mixture. In one specific embodiment, the foamed mixture includes about 1275 pounds of fly ash per cubic yard of the foamed mixture and about 575 pounds of water per cubic yard of the foamed mixture and about 10 cubic feet of foam per cubic yard of the foamed mixture.

Cementitious materials other than fly ash, such as portland cement, may also be used in the foamed mixture. It is also contemplated that other materials, such as fine aggregate and coarse aggregate, may be included in the foamed mixture. However, in certain embodiments, the foamed mixture may consist essentially of water, fly ash and foam. This avoids the need to integrate other materials into the foamed mixture that may affect properties of the final cured product.

After the foamed mixture is prepared, different process steps may be undertaken. In Option #1 of FIG. 1, the foamed mixture is removed from the mixer and loaded onto a vehicle that transports the foamed mixture to a curing station where the foamed mixture sets. In geographic locations where cold winters are experienced, the foamed mixture may be transported to a curing station in the power plant building or to a below ground silo/bin. In order to accelerate curing/setting of the foamed mixture, flue gas and/or low grade stream heat, preferably recovered from the power plant, are passed over and/or through the foamed mixture. During the summer season, or in geographic locations where cold winters are not experienced, the foamed mixture may be transported to an outdoor storage pile for curing/setting of the foamed mixture.

During curing/setting of the foamed mixture, the carbon dioxide in the flue gas dispersed in the foaming agent reacts with hydration products in the foamed mixture and in turn sequesters the carbon dioxide. The cured/set foamed mixture typically meets the standards for controlled low-strength materials as published by the American Concrete Institute. For example, the process of the invention produces a controlled low-strength material that results in a compressive strength of 8.3 MPa (1200 psi) or less at the conventional 28 day testing period, and may produce a controlled low-strength material with unconfined compressive strengths of 2.1 MPa (300 psi) or less at the conventional 28 day testing period.

Referring still to FIG. 1, after curing/setting of the foamed mixture, the cured mass may be crushed into aggregate and thereafter screened into an undersize fine aggregate fraction and a coarse aggregate fraction that meets a predetermined coarse aggregate material specification such as those published by the American Society for Testing and Materials. The lightweight aggregate has properties similar to the naturally occurring mineral, pumice.

In Option #2 of FIG. 1, the foamed mixture is removed from the mixer and fed to a shaping device such as a pan pelletizer, extruder or briquetter for shaping into aggregate. In geographic locations where cold winters are experienced, the shaped aggregate is conveyed to a curing station in the power plant building or to a below ground silo/bin. In order to accelerate curing/setting of the shaped aggregate, flue gas and/or low grade stream heat, preferably recovered from the power plant, are passed over and/or through the shaped aggregate. During the summer season, or in geographic locations where cold winters are not experienced, the shaped aggregate may be transported to an outdoor storage pile for curing/setting of the shaped aggregate.

EXAMPLES

The following Examples have been presented in order to further illustrate the invention and are not intended to limit the invention in any way.

1. Experimental Overview

The experiments detailed below included performance testing and evaluation of foamed controlled low-strength materials (CLSM) produced using a commercial foam generator. The CLSM included an ASTM Class C fly ash, water, and foam. The CLSM was produced using the foam generator with one of three different types of compressed gases: compressed air, carbon dioxide, and a mixed gas. This mixed gas was used to simulate a typical flue gas generated from the combustion of coal at a typical electric power plant. The experiments explored the feasibility of using flue gas to generate a low-density CLSM with sufficient strength to be used as a lightweight aggregate. It was determined that the use of the flue gas promotes carbonation of the sample thereby increasing the compressive strength and binding the carbon dioxide in the carbonation reaction. It was also determined that the carbonation reaction of the CLSM could reduce carbon dioxide emissions at a coal-fired power plant. The use of a foam generator was intended to have two effects on the CLSM produced, to lower the density of the material, and to distribute the selected gas throughout the CLSM. The distributed gas bubbles would then provide a source for the carbonation reaction within the CLSM.

2. Materials

A. Fly Ash

One source of fly ash was used throughout the experiments. The fly ash was obtained from We Energies Power Plant in Oak Creek, Wis., USA. This fly ash represents a typical ASTM C 618 Class C fly ash. See ASTM C 618, "Standard Specification for Fly Ash and Raw or Calcined Natural Pozzolan for Use as a Mineral Admixture in Portland Cement Concrete" for detailed specifications. Material characteristics of the fly ash are given in Tables 1 and 2.

TABLE 1

Physical Properties of Oak Creek Fly Ash

| Analysis Parameter | Material Oak Creek Fly Ash | ASTM C 618 Requirements Class N | Class C | Class F |
|---|---|---|---|---|
| Moisture Content, (%) | 0.02 | 3.0 max. | 3.0 max. | 3.0 max. |
| Retained on No. 325 Sieve (%) | 10.6 | — | 34 max. | 34 max. |
| Strength Activity Index with Cement (% of Control) | | | | |
| 7-day | 100.4 | 75 min. | 75 min. | 75 min. |
| 28-day | 104.6 | 75 min. | 75 min. | 75 min. |
| Water Requirement, (% of Control) | 93.0 | 115 max. | 105 max. | 105 max. |

TABLE 1-continued

Physical Properties of Oak Creek Fly Ash

| Analysis Parameter | Material Oak Creek Fly Ash | ASTM C 618 Requirements Class N | Class C | Class F |
|---|---|---|---|---|
| Autoclave Expansion, (%) | 0.07 | 0.8 max. | 0.8 max. | 0.8 max. |
| Density | 2.68 | — | — | — |

TABLE 2

Chemical Analysis of Oak Creek Fly Ash

| Chemical Composition | Oak Creek Fly Ash, % | ASTM C 618 Limits, % Class N | Class C | Class F |
|---|---|---|---|---|
| Silicon Dioxide, $SiO_2$ | 35.2 | — | — | — |
| Aluminum Oxide, $Al_2O_3$ | 19.4 | — | — | — |
| Iron Oxide, $Fe_2O_3$ | 5.9 | — | — | — |
| Total, $SiO_2 + Al_2O_3 + Fe_2O_3$ | 60.5 | 70.0 min. | 50.0 min. | 70.0 min. |
| Sulfur Trioxide, $SO_3$ | 1.5 | 5.0 max. | 5.0 max. | 5.0 max |
| Calcium Oxide, CaO | 25.1 | — | — | — |
| Magnesium Oxide, MgO | 6.4 | — | — | — |
| Titanium Dioxide, $TiO_2$ | 1.4 | — | — | — |
| Potassium Oxide, $K_2O$ | 0.4 | — | — | — |
| Sodium Oxide, $Na_2O$ | 2.2 | — | — | — |
| Loss on Ignition | 0.2 | 10.0 max.* | 6.0 max.* | 6.0 max.* |
| Available Alkali (equivalent % of $Na_2O$) | 1.4 | 1.5 max.** | 1.5 max.** | 1.5 max.** |

*Under certain circumstances, up to 12.0% max. LOI may be allowed.
**Optional. Required for ASR Minimization.

B. Foam Concentrate

A foam concentrate solution was used for generating foam. The foam concentrate was obtained from Elastizell Corporation of America, Dexter, Mich., USA. Prior to mixing the CLSM, the foam concentrate was diluted with water at a ratio of 40 parts of water to one part of foam concentrate by volume. Temperature of the water used to mix the foam concentrate was increased when carbon dioxide was used to generate the foam.

C. Compressed Gas

Three types of compressed gas were used to generate the foam: compressed air, carbon dioxide, and a gas used to simulate flue gas from a coal burning electric power plant. Dry air at sea level typically contains, among other things, 75.53 wt. % nitrogen, 23.16 wt. % oxygen and 0.033 wt. % carbon dioxide. The simulated flue gas consisted of a mixture of carbon dioxide, sulfur dioxide, nitrogen, and nitrous oxide. The carbon dioxide concentration in the simulated flue gas was 11.4%.

D. Foam Generator

The foam generator was a Mini (½") Open Air-Foam-Generating System (MiniOAS) manufactured by Elastizell that included a regulator, diaphragm pump, and foam mixing nozzle. Two pressure regulators were used for the compressed gas supply, one at the compressed gas tank, and the second at the foam generator. Gas from the tank was regulated to a pressure of 175 psi prior to introduction in the foam generator. When using carbon dioxide, a rubber hose extension, approximately six feet long, was used to warm the carbon dioxide gas before introduction into the foam generator. Without the additional length of hose, the foam generator began to freeze and leak gas. The regulator on the foam generator was adjusted to 100 psi. The intake hose from the diaphragm pump was placed in the foam concentrate solution which was diluted using the ratio specified by the manufacturer of 40 parts of water to one part of foam concentrate by volume. The valve on the foam nozzle was opened and foam was generated until it reached a uniform quality (within approximately 5 to 10 seconds). The valve on the nozzle was then closed until foam was to be added to the CLSM mixture. For each type of gas used, the density of the foam and the rate of foam production were calculated. Characteristics of the foam generated is given in Table 3.

foam was either added all at once, or periodically during the mixing of the CLSM when carbon dioxide was used to generate foam. Due to the number of test specimens required for the specified tests, two replicate mixtures were prepared for each of the final mixtures for each type of gas.

4. CLSM Specimen Preparation and Testing

Fresh CLSM properties such as unit weight (ASTM D 6023) were measured and recorded. CLSM temperature was also measured and recorded. 6-inch diameter by 12-inch long cylindrical test specimens were prepared from each mixture for compressive strength (ASTM D 4832) and carbonation testing (RILEM CPC18). Compressive strength of the final CLSM mixtures were evaluated at the specified ages of 1, 3, 7, 28, 56, 91, 182, and 365 days. All test specimens were cast in accordance with ASTM D 4832. Three CLSM test specimens were tested at each test age. These specimens were typically cured for one day in their molds at about 70°±5° F.

TABLE 3

Characteristics of Foam Generated*

| | Gas Source | | | | | | |
|---|---|---|---|---|---|---|---|
| | Compressed Air Trial Number | Simulated Flue Gas Trial Number | | Carbon Dioxide Trial Number | | | |
| Property | 1 | 1 | 2 | 1 | 2 | 3 | 4 |
| Foam Generation Rate (ft³/min) | 8.4 | — | 8.4 | 6.0 | 4.8 | 5.3 | 5.4 |
| Foam Density (lb/ft³) | 2.6 | — | 2.8 | 4.1 | — | 4.5 | 4.2 |
| Comments | Foam appeared to consist of very fine bubbles. Stable foam, did not appear to break down. | No foam was generated. Gas in partially filled tank consumed while adjusting pressures of regulators. | Foam appeared to break down slightly over time. | Foam broke down entirely within 5-10 minutes. Regulator with 18-inch braided s.s. hose connected directly to foam generator. Frost on foam generator and regulator after use. | Foam solution mixed with hot (87° F.) water). Foam appeared to be more stable than in Trial 1. Used 6-ft. hose extension between regulator fitting and foam generator. | Foam solution mixed with cold (45° F.) water). Foam volume and density determined 2 minutes after generating. | Foam solution mixed with warm (87° F.) water). Foam volume and density determined 2 minutes after generating. |

*Regulator pressure on the gas tank adjusted for 175 psi feed to foam generator. Regulator on foam generator set at 100 psi. (Two pressure regulators used.)

3. Manufacturing of CLSM Mixtures

CLSM was mixed using a rotating-drum mixer with a volume of nine cubic feet (for final CLSM mixtures). All CLSM ingredients were manually weighed and loaded in the mixer. The required amounts of the fly ash and water were loaded into the mixer and mixed for three minutes. If during the mixing process, ash agglomerated and adhered to the inside surface of the mixer, the mixer was briefly stopped, material was scraped from the mixer surface and then restarted for the remaining time. The desired volume of the foam was then added to the CLSM with the mixer running. The amount of foam was specified as a volume for each mixture. Since the rate of foam generation was determined, the amount of foam was timed to obtain the specified volume. When the foam had uniformly mixed into the CLSM, the CLSM was discharged onto a pan for tests of unit weight and temperature, and for casting of test specimens. Depending upon the type of gas used to generate the foam, the amount of The test specimens were then demolded and placed in a curing room maintained at 50% R.H. and 73°±3° F. temperature until the time of test. Initial humidity of the curing room increased to approximately 75% for the first 7 to 14 days after the specimens were placed in it due to evaporation of water from the foamed test specimens.

5. Carbonation Evaluation

In order to evaluate the effects of the different types of gases used in the foamed-CLSM, carbonation of the mixtures was tested in accordance with RILEM test procedure CPC18, Measurement of Hardened Concrete Carbonation Depth (Materials and Structures, Vol. 21, No. 126, November-December 1988). In accordance with this test procedure, a phenolphthalein indicator solution is sprayed onto a broken section of test cylinder. A solution of 1% phenolphthalein in 70% ethyl alcohol was used. The cylinders used for the carbonation measurement were first tested for splitting-tensile strength. The splitting-tensile strength test was performed per ASTM C 496 modified for the CLSM test specimens by reducing the loading rate to approximately 500-600 lb./min. The broken surface of the cylinder was lightly brushed (with a horse-hair brush to avoid damaging the surface of the CLSM) to remove loose particles, and then sprayed with the indicator solution. Typically, the indicator solution was applied approximately two to three minutes after completion of the test for splitting-tensile strength. Carbonated areas of the test specimens remain colorless, while non-carbonated areas turn pinkish-red. Measurements for the depth of carbonation were taken after one to two minutes of application of the indicator solution.

6. Mixture Proportions

A. CLSM Mixture Proportions

Three different types of CLSM mixtures were prepared and tested. One mixture of CLSM was made for each source of compressed gas: air, simulated flue gas, and carbon dioxide. The basic mixture proportions were: Foam: 10 $ft^3/yd^3$ of CLSM; Fly Ash (ASTM C 618, Class C): 1275 $lb/yd^3$; and Water: 575 $lb/yd^3$.

B. CLSM Trial Mixture Proportions

Foamed-CLSM mixtures were first produced in batches of approximately one cubic foot to establish initial fresh foamed-CLSM density, as well as to establish mixture proportions based on yield of the test batches. These trial mixtures were also produced to confirm and adjust the density of the CLSM. The trial mixture proportions and fresh CLSM properties of the CLSM produced with compressed air are shown in Table 4. CLSM produced with compressed air had a low density, but setting time was very short, within one to two minutes after the addition of the compressed-air-foam into the CLSM mixture.

Details of the properties of the trial CLSM mixtures using the simulated flue gas source are given in Table 5. This mixture also exhibited a very fast time of set; however, it was slower than the mixture containing compressed air.

Mixture proportions and fresh CLSM properties of trial mixtures using carbon dioxide are given in Table 6. Carbon dioxide, when introduced into the mixer, appeared to retard the setting of the CLSM significantly compared to CLSM that used compressed air or simulated flue gas. The air that was introduced with the foam also quickly dissipated from the CLSM. After a series of trial mixtures, the desired density of the CLSM was achieved by extended mixing time and periodic addition of the foam containing carbon dioxide. CLSM was mixed for a total of approximately 20 to 25 minutes before the air content of the CLSM became stable enough to produce test specimens. The voids observed in a broken section of CLSM, that used carbon dioxide appeared to be larger than the voids observed in CLSM that used either compressed air or the simulated flue gas.

TABLE 4

Foamed-CLSM Trial Mixture Proportions
Gas Source: Compressed Air

|  | Mixture Number WEFS-1 |
|---|---|
| Fly Ash, Dry Wt., $lb/yd^3$ | 1210 |
| Foam Generated, $ft^3/yd^3$ | 9.6 |
| Foam Generated, $lb/yd^3$ | 24.4 |
| Water, $lb/yd^3$ | 545 |
| Flow, in. | 6¼ |
| Fresh Foamed-CLSM Density ($lb/ft^3$) | 65.9 |
| Compressive Strength, psi    1-day | 115 |

TABLE 5

Foamed-CLSM Trial Mixture Proportions
Gas Source: Simulated Flue Gas

|  | Mixture Number WEFS-2 |
|---|---|
| Fly Ash, Dry Wt., $lb/yd^3$ | 1230 |
| Foam Generated, $ft^3/yd^3$ | 9.8 |
| Foam Generated, $lb/yd^3$ | 26.1 |
| Water, $lb/yd^3$ | 555 |
| Flow, in. | 8½ |
| Fresh Foamed-CLSM Density ($lb/ft^3$) | 67.2 |
| Compressive Strength, psi    1-day | 185 |

TABLE 6

Foamed-CLSM Trial Mixture Proportions
Gas Source: Carbon Dioxide

|  | Mixture Number | | | | | |
|---|---|---|---|---|---|---|
|  | WEFS-3 | WEFS-4 | WEFS-5 | WEFS-6 | WEFS-7 | WEFS-8 |
| Fly Ash, Dry Wt., $lb/yd^3$ | 1930 | 1890 | 1690 | 1605 | 1555 | 1475 |
| Foam Generated, $ft^3/yd^3$ | 15.3 | 16.6 | 55.0 | 80.5 | 149.3 | 118 |
| Foam Generated, $lb/yd^3$ | 12.8 | 13.1 | 45.0 | 65.8 | 122.9 | 101.3 |
| Foam Concentrate/Water Temperature, °F. | 45 | 82 | 67 | 67 | 67 | 95 |
| Water, $lb/yd^3$ | 870 | 853 | 762 | 724 | 527 | 505 |
| Water Temperature, °F. | 45 | 45 | 67 | 67 | 67 | 108 |
| Fresh Foamed-CLSM Density ($lb/ft^3$) | 104.2 | 102.0 | 92.8 | 88.4 | 81.4 | 77.6 |
| Hardened Foamed-CLSM Density ($lb/ft^3$) | 104.5 | 103.9 | 93.3 | 90.0 | 86.1 | — |

TABLE 6-continued

Foamed-CLSM Trial Mixture Proportions
Gas Source: Carbon Dioxide

|  | Mixture Number | | | | | |
|---|---|---|---|---|---|---|
|  | WEFS-3 | WEFS-4 | WEFS-5 | WEFS-6 | WEFS-7 | WEFS-8 |
| Compressive Strength, psi | 450 (6-days) | 455 (6-days) | 255 (1-day) | 145 (1-day) | 50 (1-day) | — |
| Comments | All foam added to mixture after ash mixed with water. | All foam added to mixture after ash mixed with water. | Foam added to mixture in three parts. | Foam added in four parts. Total mixing time = 22.33 min. Foam added at 4-min., 5-min., 9-min., 16-min., and 22 min. after start of mixing | Foam added to mixture in 7 parts. Total mixing time = 25 minutes. | Foam added in 4 parts. Mixture used hot water for both mixing water and generating foam. |

C. CLSM Final Mixtures Proportions

CLSM final mixture proportions and fresh properties for foamed-CLSM are given in Tables 7 to 9. Similar to the trial mixtures, the CLSM produced with compressed air exhibited extremely short setting time after the foam was added to the mixture. Due to insufficient consolidation of the test cylinders for mixtures FS-1 and FS-1A (CLSM was just poured into the cylinder molds), three batches of mixtures were required (Table 7) for the compressed-air-CLSM. The CLSM mixture went through its final set while CLSM was being placed in the test cylinders. Subsequent mixtures using compressed air used an ASTM designated vibratory table to further consolidate the test cylinders when the consistency of the CLSM became less flowable (i.e., more stiff). Mixture FS-1B was produced to obtain additional test specimens. Fresh density of the CLSM was 69.5 (±1) lb/ft$^3$. The hardened density of the CLSM after approximately 182 days of curing at 50 to 75% R.H. was less than 56.3 lb/ft$^3$.

CLSM produced with the simulated flue gas also exhibited a very short setting time after the foam was added to the mixture. The quantity of the foam added to the mixture and the fresh CLSM density (Table 8) were similar to the foamed-CLSM made with compressed air. Fresh density of the CLSM ranged from 66.6 to 70.8 lb/ft$^3$. The hardened density of the CLSM after approximately 182 days of curing at 50 to 75% R.H. was less than 57.6 lb/ft$^3$.

Fresh foamed-CLSM properties of the final mixtures using carbon dioxide are shown in Table 9. Fresh density of CLSM using carbon dioxide ranged from 65.7 to 70.6 lb/ft$^3$. To obtain a fresh density of CLSM made with carbon dioxide similar to mixtures using either compressed air or the simulated flue gas, the foam required was approximately eight times the volume of the foam required for compressed air or the simulated flue gas. The foam was added in several parts, more foam was added each time when the CLSM appeared to be beginning to stiffen. The water was also reduced to partially account for the large volume of foam being added to the mixture. The test cylinders appeared to accumulate froth on the top of the cylinders while in the molds. This indicates that some of the air incorporated into the CLSM had migrated to the surface. The density of the hardened CLSM after approximately 182 days of curing at 50 to 75% R.H. was 47.8 lb/ft$^3$, which was less than the CLSM produced with the other two gases.

TABLE 7

Final Foamed-CLSM Mixture Proportions
Gas Source: Compressed Air

|  | Mixture Number | | |
|---|---|---|---|
|  | FS-1* | FS-1A* | FS-1B |
| Fly Ash, Dry Wt., lb/yd$^3$ | 1290 | 1265 | 1235 |
| Foam Generated, ft$^3$/yd$^3$ | 10.3 | 10.1 | 9.9 |
| Foam Generated, lb/yd$^3$ | 26.4 | 25.8 | 25.2 |
| Water, lb/yd$^3$ | 585 | 570 | 566 |
| Air Temperature (° F.) | 68 | 68 | 68 |
| Foamed-CLSM Temperature (° F.) | 66 | 65 | 72 |
| Fresh Foamed-CLSM Density (lb/ft$^3$) | 70.6 | 69.6 | 68.4 |
| Hardened Foamed-CLSM Density (182-day age) (lb/ft$^3$) |  | 56.3 |  |

*Approximately half of the test specimens cast from these mixtures were discarded due to insufficient consolidation. CLSM stiffened while material was being placed in cylinders.

TABLE 8

Final Foamed-CLSM Mixture Proportions
Gas Source: Simulated Flue Gas

|  | Mixture Number | |
|---|---|---|
|  | FS-2 | FS-2A |
| Fly Ash, Dry Wt., lb/yd$^3$ | 1230 | 1287 |
| Foam Generated, ft$^3$/yd$^3$ | 9.7 | 10.1 |
| Foam Generated, lb/yd$^3$ | 27 | 28.2 |
| Water, lb/yd$^3$ | 555 | 579 |
| Air Temperature (° F.) | 65 | 68 |
| Foamed-CLSM Temperature (° F.) | 72 | 67 |
| Fresh Foamed-CLSM Density (lb/ft$^3$) | 66.6 | 70.8 |
| Hardened Foamed-CLSM Density (182-day age) (lb/ft$^3$) |  | 57.6 |

TABLE 9

Final Foamed-CLSM Mixture Proportions
Gas Source: Carbon Dioxide

| | Mixture Number | |
|---|---|---|
| | FS-3 | FS-3A |
| Fly Ash, Dry Wt., lb/yd$^3$ | 1160 | 1080 |
| Foam Generated, ft$^3$/yd$^3$ | 85 | 82 |
| Foam Generated, lb/yd$^3$ | 360 | 350 |
| Water, lb/yd$^3$ | 390 | 365 |
| Air Temperature (° F.) | 62 | 60 |
| Foamed-CLSM Temperature (° F.) | 98 | 102 |
| Fresh Foamed-CLSM Density (lb/ft$^3$) | 70.6 | 65.7 |
| Hardened Foamed-CLSM Density (182-day age) (lb/ft$^3$) | 48.7 | |

7. Mechanical Properties

A. CLSM Compressive Strength

CLSM has a maximum compressive strength specified by ACI Committee 229 as 1,200 psi at the age of 28 days. A desirable 28-day compressive strength for CLSM that is used as a fill material and required to be removed with hand shovels at a later age is usually specified to be less than 100 psi.

The compressive strength data for all the CLSM mixtures are presented in Tables 10-12. Compressive strength of the CLSM mixtures using foam generated with compressed air (Mixtures FS-1/1 A and FS-1B) increased from 120 psi at the age of one day, to 310 psi at 182 days. Compressive strength for the CLSM using the simulated flue gas is given in Table 11. The compressive strength of these mixtures was lower at the age of one day, 85 psi, compared to the compressed air CLSM, but increased to 470 psi at the age of 182 days. The compressive strengths developed by CLSM mixtures using carbon dioxide (Table 12), at the age of one day was 90 psi; and only 150 psi at the age of 182 days. For this CLSM mixture, compressive strength actually decreased from a maximum at 28 days of 195 psi (probably because this batch of CLSM was of a lower density).

Figure 2:
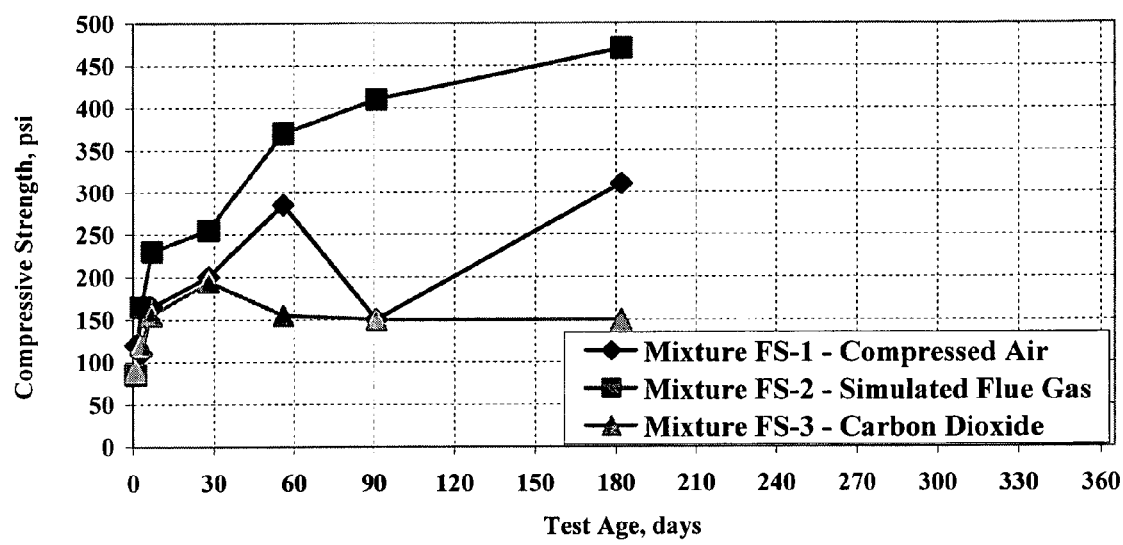
FIG. 2 is a graph showing the compressive strength of foamed CLSM mixtures.

A comparison of the compressive strength of the three types of foamed-CLSM is shown in FIG. 2. This figure shows that the compressive strength developed by the foamed-CLSM using the simulated flue gas was higher than the CLSM using the other two gas sources beginning at the age of 3 days. This trend continued through the later ages. The mixture of the simulated flue gas provided a much better strength gain, especially when compared to carbon dioxide alone at later ages.

TABLE 10

Compressive Strength of Foamed-CLSM
Gas Source: Compressed Air

Compressive Strength, psi

| | Mixture Number | | | |
|---|---|---|---|---|
| | FS-1/FS-1A | | FS-1B | |
| Test Age, days | Actual | Average | Actual | Average |
| 1 | 105 | 120 | — | — |
| | 120 | | — | |
| | 135 | | — | |

TABLE 10-continued

Compressive Strength of Foamed-CLSM
Gas Source: Compressed Air

Compressive Strength, psi

| | Mixture Number | | | |
|---|---|---|---|---|
| | FS-1/FS-1A | | FS-1B | |
| Test Age, days | Actual | Average | Actual | Average |
| 3 | 160 | 110 | — | — |
| | 80 | | — | |
| | 90 | | — | |
| 7 | 165 | 165 | — | — |
| | 200 | | — | |
| | 135 | | — | |
| 28 | 230 | 200 | — | — |
| | — | | — | |
| | 175 | | — | |
| 56 | — | — | 310 | 285 |
| | — | | 250 | |
| | — | | 295 | |
| 91 | — | — | 145 | 150 |
| | — | | 155 | |
| | — | | 150 | |
| 182 | — | — | 320 | 310 |
| | — | | 390 | |
| | — | | 215 | |
| 365 | — | — | — | — |
| | — | | | |
| | — | | | |

TABLE 11

Compressive Strength of Foamed-CLSM
Gas Source: Simulated Flue Gas

Compressive Strength, psi

| | Mixture Number | | | |
|---|---|---|---|---|
| | FS-2 | | FS-2A | |
| Test Age, days | Actual | Average | Actual | Average |
| 1 | 70 | 85 | — | — |
| | 95 | | — | |
| | 85 | | — | |
| 3 | 90 | 165 | — | — |
| | 210 | | — | |
| | 190 | | — | |
| 7 | 205 | 230 | — | — |
| | 250 | | — | |
| | 240 | | — | |
| 28 | 255 | 255 | — | — |
| | 265 | | — | |
| | 245 | | — | |
| 56 | — | — | 350 | 370 |
| | — | | 390 | |
| | — | | 375 | |
| 91 | — | — | 370 | 410 |
| | — | | 420 | |
| | — | | 445 | |
| 182 | — | — | 405 | 470 |
| | — | | 555 | |
| | — | | 450 | |
| 365 | — | — | — | — |
| | — | | | |
| | — | | | |

TABLE 12

Compressive Strength of Foamed-CLSM
Gas Source: Carbon Dioxide

Compressive Strength, psi

| | Mixture Number | | | |
|---|---|---|---|---|
| | FS-3 | | FS-3A | |
| Test Age, days | Actual | Average | Actual | Average |
| 1 | 115 | 90 | — | — |
|   | 75 |    | — |   |
|   | 85 |    | — |   |
| 3 | 110 | 120 | — | — |
|   | 120 |    | — |   |
|   | 135 |    | — |   |
| 7 | 165 | 155 | — | — |
|   | 150 |    | — |   |
|   | 155 |    | — |   |
| 28 | 215 | 195 | — | — |
|    | 175 |    | — |   |
|    | 195 |    | — |   |
| 56 | — | — | 180 | 155 |
|    | — | — | 140 |   |
|    | — | — | 140 |   |
| 91 | — | — | 160 | 150 |
|    | — | — | 140 |   |
|    | — | — | 145 |   |
| 182 | — | — | 145 | 150 |
|     | — | — | 150 |   |
|     | — | — | -   |   |
| 365 | — | — |    |   |
|     | — | — |    |   |
|     | — | — |    |   |

TABLE 13

Foamed-CLSM Carbonation
Gas Source: Compressed Air

Carbonation Depth

| | Mixture Number | | | | | |
|---|---|---|---|---|---|---|
| | FS-1/FS-1A | | | FS-1B | | |
| Test Age, days | Average at top, sides, bottom, mm | Average, mm | % Carbonation | Average at top, sides, bottom, mm | Average, mm | % Carbonation |
| 1 | 0 | 0 | 0 | — | — | — |
|   | 0 |   |   | — |   |   |
|   | 0 |   |   | — |   |   |
| 3 | 1 | 1 | 2.0 | — | — | — |
|   | 1 |   |   | — |   |   |
|   | 1 |   |   | — |   |   |
| 7 | 4.5 | 4.5 | 8.9 | — | — | — |
|   | 4.5 |   |   | — |   |   |
|   | 4.5 |   |   | — |   |   |
| 28 | 10 | 10 | 19.1 | — | — | — |
|    | 10 |   |   | — |   |   |
|    | 10 |   |   | — |   |   |
| 56 | — | — | — | 25 | 25 | 44.4 |
|    | — |   |   | 25 |   |   |
|    | — |   |   | 25 |   |   |
| 91 | — | — | — | 30 | 30 | 62.0 |
|    | — |   |   | 30 |   |   |
|    | — |   |   | 30 |   |   |
| 182 | — | — | — | N/A | Full-Depth | 100% |
|     | — |   |   | N/A |   |   |
|     | — |   |   | N/A |   |   |
| 365 | — | — | — |   |   |   |
|     | — |   |   |   |   |   |
|     | — |   |   |   |   |   |

8. Carbonation Testing

A. Carbonation of CLSM Mixtures

Figure 3:
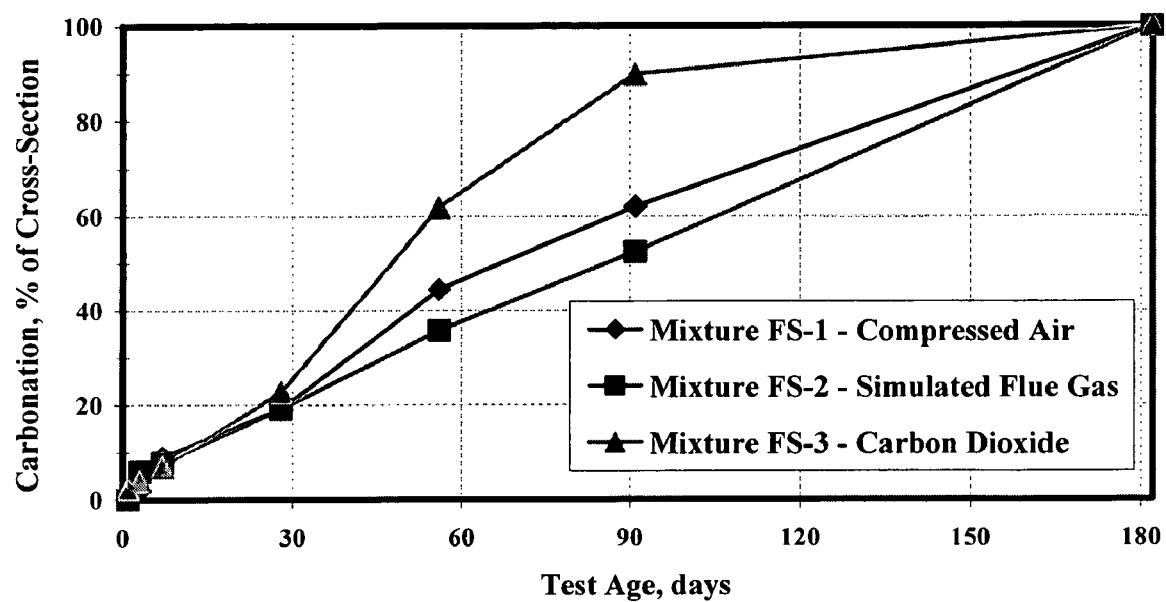
FIG. 3 is a graph showing carbonation of foamed-CLSM mixtures in 6 inch diameter by 12 inch long cylinders.

The carbonation measurements obtained from the CLSM specimens are shown in Tables 13-15 and FIG. 3. The carbonation of the CLSM mixtures shown in Table 13 is for CLSM using compressed air, Table 14 for CLSM using simulated flue gas, and Table 15 for CLSM with carbon dioxide. FIG. 3 shows the comparison of carbonation for all three types of CLSM. Carbonation of the foamed-CLSM specimens that used compressed air increased from no indication of carbonation at the age of one day, to complete carbonation at the age of 182 days. Carbonation of CLSM that used the simulated flue gas exhibited a similar carbonation pattern increasing from zero at the age of one day to 100% carbonation at the age of 182 days. The CLSM that used the carbon dioxide started carbonation more quickly. Approximately two percent of the specimen was carbonated at the age of one day to over 89% at the age of 91 days.

These results illustrate that using carbon dioxide in CLSM has a greater effect on the rate of carbonation than either the compressed air or the simulated flue gas. This comparison is more clearly visible in FIG. 3. The rate of carbonation is approximately the same for CLSM using the compressed air or simulated flue gas. Assuming the same rate of carbonation for the CLSM with carbon dioxide, complete carbonation can be estimated at the age of less than 120 days. The carbonation tested at the age of 182 days confirmed that this type of CLSM is completely carbonated.

TABLE 14

Foamed-CLSM Mixture Carbonation
Gas Source: Simulated Flue Gas

Carbonation Depth

| | Mixture Number | | | | | |
|---|---|---|---|---|---|---|
| | FS-2 | | | FS-2A | | |
| Test Age, days | Average at top, sides, bottom, mm | Average, mm | % Carbonation | Average at top, sides, bottom, mm | Average, mm | % Carbonation |
| 1 | 0 | 0 | 0 | — | — | — |
|   | 0 |   |   | — |   |   |
|   | 0 |   |   | — |   |   |
| 3 | 3 | 3 | 5.9 | — | — | — |
|   | 3 |   |   | — |   |   |
|   | 3 |   |   | — |   |   |
| 7 | 4 | 4 | 7.9 | — | — | — |
|   | 4 |   |   | — |   |   |
|   | 4 |   |   | — |   |   |
| 28 | 10 | 10 | 19.1 | — | — | — |
|    | 10 |   |   | — |   |   |
|    | 10 |   |   | — |   |   |
| 56 | — | — | — | 17 | 19 | 35.7 |
|    | — |   |   | 20 |   |   |
|    | — |   |   | 20 |   |   |
| 91 | — | — | — | 24 | 28 | 52.4 |
|    | — |   |   | 32 |   |   |
|    | — |   |   | 27 |   |   |

TABLE 14-continued

Foamed-CLSM Mixture Carbonation
Gas Source: Simulated Flue Gas

Carbonation Depth

Mixture Number

| Test Age, days | FS-2 Average at top, sides, bottom, mm | Average, mm | % Carbon-ation | FS-2A Average at top, sides, bottom, mm | Average, mm | % Carbon-ation |
|---|---|---|---|---|---|---|
| 182 | — — — | — | — | N/A N/A N/A | Full-Depth | 100% |
| 365 | — — — | — | — | | | |

TABLE 15

Foamed-CLSM Mixture Carbonation
Gas Source: Carbon Dioxide

Carbonation Depth

Mixture Number

| Test Age, days | FS-3 Average at top, sides, bottom, mm | Average, mm | % Carbon-ation | FS-3A Average at top, sides, bottom, mm | Average, mm | % Carbon-ation |
|---|---|---|---|---|---|---|
| 1 | 7 0 0 | 2 | 2.3 | — — — | — | — |
| 3 | 2 2 2 | 2 | 4.0 | — — — | — | — |
| 7 | 6.5 3 3 | 4 | 7.0 | — — — | — | — |
| 28 | 14 12 10 | 12 | 22.7 | — — — | — | — |
| 56 | — — — | — | — | 37 37 37 | 37 | 61.8 |
| 91 | — — — | — | — | 84 62 40 | 62 | 89.8 |
| 182 | — — — | — | — | N/A N/A N/A | Full-Depth | 100 |
| 365 | — — — | — | — | — — — | | |

9. Measured Properties for Foamed-CLSM FS-1, FS-2, FS-3

For the purposes of illustration only, Tables 16-25 provide properties for materials FS-1, FS-2 and FS-3 prepared above in relation to American Society for Testing and Materials (ASTM) specifications and other materials.

TABLE 16

Coarse Aggregate Summary

| Parameter | ASTM | FS-1 | FS-2 | FS-3 | Pumice |
|---|---|---|---|---|---|
| Staining | C641 | 0 | 0 | 0 | 0 |
| Clay Lumps | C142 | 10-11% | 8-9% | 17-18% | — |
| Gradation | C29 | See Table 17 | See Table 18 | See Table 19 | — |
| Dry Bulk Density | C29 | 38.6 | 35.1 | 34.8 | 38.4 |
| SG (OD) | C127 | 1.04 | 1.00 | 0.87 | .95 |
| SG (SSD) | C127 | 1.37 | 1.24 | 1.27 | 1.16 |
| Soundness | C88 (2 cycles) | 6% loss | 4% loss | 6% loss | 5% loss |
| Absorption | C127 | 30.9 | 23.59 | 46.13 | 21.3 |

TABLE 17

Coarse Aggregate FS-1

| Sieve | Sieve Opening (mm) | Percent Passing (%) | Specifications Low | High |
|---|---|---|---|---|
| 1.000 | 25.400 | | | |
| 0.750 | 19.050 | 100.0 | 90 | 100 |
| 0.375 | 9.525 | 39.4 | 20 | 55 |
| #4 | 4.750 | 5.4 | | 10 |
| #8 | 2.360 | 3.3 | | 5 |
| #50 | 0.300 | 3.2 | | |
| #100 | 0.150 | 2.9 | | |
| #200 | 0.075 | 2.1 | | |

TABLE 18

Coarse Aggregate FS-2

| Sieve | Sieve Opening (mm) | Percent Passing (%) | Specifications Low | High |
|---|---|---|---|---|
| 1.000 | 25.400 | | | |
| 0.750 | 19.050 | 99.7 | 90 | 100 |
| 0.375 | 9.525 | 21.5 | 20 | 55 |
| #4 | 4.750 | 5.3 | | 10 |
| #8 | 2.360 | 5.2 | | 5 |
| #50 | 0.300 | 3.0 | | |
| #100 | 0.150 | 2.6 | | |
| #200 | 0.075 | 1.1 | | |

TABLE 19

Coarse Aggregate FS-3

| Sieve | Sieve Opening (mm) | Percent Passing (%) | Specifications Low | High |
|---|---|---|---|---|
| 1.000 | 25.400 | | | |
| 0.750 | 19.050 | 99.9 | 90 | 100 |
| 0.375 | 9.525 | 42.4 | 20 | 55 |
| #4 | 4.750 | 11.3 | | 10 |
| #8 | 2.360 | 4.9 | | 5 |
| #50 | 0.300 | 4.5 | | |
| #100 | 0.150 | 3.1 | | |
| #200 | 0.075 | 1.4 | | |

TABLE 20

Fine Aggregate Summary

| Parameter | ASTM | FS-1 | FS-2 | FS-3 | Pumice |
|---|---|---|---|---|---|
| Clay Lumps | C142 | 11% | 13% | 19% | — |
| Gradation | C29 | See Table 24 | See Table 24 | See Table 24 | — |
| Dry Bulk Density | C29 | 59.9 | 69.0 | 62.5 | 54.8 |
| SG (OD) | C127 | 1.59 | 2.01 | 2.04 | 1.44 |
| SG (SSD) | C127 | 1.78 | 2.01 | 2.04 | 1.69 |

TABLE 21

ASTM C330 Standard Specification for LWA for Structural Concrete*
Maximum Dry Loose Bulk Density (lb/ft$^3$)

| | Fine | | Coarse | |
|---|---|---|---|---|
| | Standard | Tested Result | Standard | Tested Result |
| FS-1 | 70 | 59.9 | 55 | 38.6 |
| FS-2 | 70 | 69 | 55 | 35.1 |
| FS-3 | 70 | 62.5 | 55 | 34.8 |

*Same results for ASTM C331 Standard Specifications for LWA for Masonry Units
LWA = Light Weight Aggregate

TABLE 22

ASTM C33 Specification for Concrete Aggregates
Soundness, Coarse Aggregate
(weighted average loss not greater than, %)

| Using Sodium Sulfate | Using Magnesium Sulfate | FS-1 (coarse) | FS-2 (coarse) | FS-3 (coarse) |
|---|---|---|---|---|
| | 18% | 6% | 4% | 6% |

TABLE 23

ASTM C33 Specification for Concrete Aggregates
Limits for Clay Lumps in Coarse Aggregate
(Maximum Allowable %)

| Class Designation | Type or Location of Concrete Construction | Clay Lumps and Friable Particles Standard | FS-1 (coarse) | FS-2 (coarse) | FS-3 (coarse) |
|---|---|---|---|---|---|
| 1S | Footings, foundations, columns, and beams not exposed to the weather, interior floor slabs to be given coverings | 10 | 10-11 | 8-9 | 17-18 |

TABLE 23-continued

ASTM C33 Specification for Concrete Aggregates
Limits for Clay Lumps in Coarse Aggregate
(Maximum Allowable %)

| Class Designation | Type or Location of Concrete Construction | Clay Lumps and Friable Particles Standard | FS-1 (coarse) | FS-2 (coarse) | FS-3 (coarse) |
|---|---|---|---|---|---|
| 2S | Interior floors without coverings | 5 | 10-11 | 8-9 | 17-18 |

TABLE 24

Fine Aggregate Gradation

| | Fine Aggregate ASTM C33 | | FS-1 | FS-2 | FS-3 | Pumice |
|---|---|---|---|---|---|---|
| Sieves | LO | HI | Fine | Fine | Fine | Fine |
| 3/8 in. (9.5 mm) | 100 | 100 | 100.0 | 100.0 | 100.0 | 100.0 |
| No. 4 (4.75 mm) | 95 | 100 | 100.0 | 96.00 | 99.00 | 87.70 |
| No. 8 (2.36 mm) | 80 | 100 | 88.0(#10) | 72.0 | 87.6 | 60.9 |
| No. 16 (1.18 mm) | 50 | 85 | | 56.0 | 77.4 | 38.1 |
| No. 30 (600 µm) | 25 | 60 | 62.0(#40) | 44.0 | 61.9 | 23.4 |
| No. 50 (300 µm) | 5 | 30 | 55.0 | 30.0 | 43.6 | 12.1 |
| No. 100 (150 µm) | 0 | 10 | 43.0 | 17.0 | 25.1 | 5.6 |
| No. 200 (75 µm) | | | 31.0 | 8.0 | 5.7 | 1.3 |

TABLE 25

Coarse Aggregate Gradation

| | Coarse Aggregate ASTM C33 | | FS-1 | FS-2 | FS-3 | Pumice |
|---|---|---|---|---|---|---|
| Sieves | LO | HI | Coarse | Coarse | Coarse | Coarse |
| 1 in. (25 mm) | | | | | | |
| 3/4 in. (19 mm) | 90 | 100 | 99.99 | 99.69 | 99.85 | 100.00 |
| 3/8 in. (9.5 mm) | 20 | 55 | 39.4 | 21.5 | 42.4 | 45.2 |
| No. 4 (4.75 mm) | 0 | 10 | 5.4 | 5.3 | 11.3 | 18.2 |
| No. 8 (2.36 mm) | 0 | 5 | 3.3 | 5.2 | 4.9 | 17.7 |
| No. 50 (300 µm) | | | 3.2 | 3.0 | 4.5 | |
| No. 100 (150 µm) | | | 2.9 | 2.6 | 3.1 | |
| No. 200 (75 µm) | | | 2.1 | 1.1 | 1.4 | 10.0 |

10. Sequestration of Carbon Dioxide in CLSM—Calculated Estimates

The following data estimates the amount of $CO_2$ that CLSM could sequester. In addition to what can be sequestered permanently in the mineral matrix of the CLSM, the process of the invention avoids $CO_2$ production. Natural lightweight aggregate requires a quarry operation. Fired lightweight aggregate requires fuel consumption and additional $CO_2$ emissions.

A. Calcium compound reactions

Assumptions:
25% by wt of Fly ash is "CaO"
2.5% by wt of fly ash is free CaO     0.000445792 mol CaO/1 g fly ash -continued

A. Calcium compound reactions

10% of "CaO" is free CaO (2.5%/25%)
molar weight of CaO = 56.08 g/mol
50% of "CaO" is $2CaO*SiO_2$      0.001114479 mol $2CaO*SiO_2$/1 g fly ash
50%*.25 g of "CaO" in $2CaO*SiO_2$ per 1 g fly ash
2 moles of CaO per mol $2CaO*SiO_2$
30% of "CaO" is $3CaO*Al_2O_3$     0.000445792 mol $3CaO*Al_2O_3$/1 g fly ash
30%*.25 g of "CaO" in $3CaO*Al_2O_3$ per 1 g fly ash
3 moles of CaO per mol $3CaO*Al_2O_3$
Rest of "CaO" in forms that do not react
to produce or consume $Ca(OH)_2$
Rxns: (assume all are 90% complete)

$CaO + H_2O \rightarrow Ca(OH)_2$     0.000401213 mol $Ca(OH)_2$ produced from CaO/1 g fly ash $2(2CaO*SiO_2) + 4H_2O \rightarrow$     0.000501516 mol $Ca(OH)_2$ produced from
$3CaO*2SiO_2*3H_2O + Ca(OH)_2$     $2CaO*SiO_2$/1 g fly ash
$3CaO*Al_2O_3 + 12H_2O + Ca(OH)_2 \rightarrow$     0.000401213 mol $Ca(OH)_2$ consumed
$3CaO*Al_2O_3*Ca(OH)_2*12H_2O$     by $3CaO*Al_2O_3$/1 g fly ash
$Ca(OH)_2 + CO_2 \rightarrow CaCO_3 + H_2O$     0.000451364 mol $CO_2$ consumed/1 g fly ash
    0.019864535 g of $CO_2$ consumed/1 g fly ash

B. Sodium compound reactions

Assumptions:

1.5% by wt of Fly ash is "$Na_2O$"
50% of "$Na_2O$" is $Na_2O_2$     0.000121007 mol $Na_2O_2$/1 g fly ash
50%*.015 g of "$Na_2O$" in $Na_2O_2$ per 1 g fly ash
1 mol of $Na_2O$ per mol $Na_2O_2$
molar weight $Na_2O$ = 61.98 g/mol
rest of "$Na_2O$" in forms that do not
react to produce or consume $Ca(OH)_2$
Rxns: (assume all are 90% complete)

$2Na_2O_2 + 2H_2O \rightarrow 4NaOH + O_2$     0.000217812 mol NaOH produced/1 g fly ash
$NaOH + CO_2 \rightarrow NaHCO_3$     0.000196031 mol $CO_2$ consumed/1 g fly ash
    0.008627323 g of $CO_2$ consumed/1 g fly ash

C. Potassium compound reactions

Assumptions:

0.5% by wt of Fly ash is "$K_2O$"
30% of "$K_2O$" is $K_2O_2$     1.59236E-05 mol $K_2O_2$/1 g fly ash
30%*.005 g of "$K_2O$" in $K_2O_2$ per 1 g fly ash
1 mol of $K_2O$ per mol $K_2O_2$
molar weight $K_2O$ = 94.2 g/mol
30% of "$K_2O$" is $KO_2$     3.18471E-05 mol $KO_2$/1 g fly ash
30%*.005 g of "$K_2O$" in $KO_2$ per 1 g fly ash
0.5 mol of $K_2O$ per mol $KO_2$
molar weight $K_2O$ = 94.2 g/mol
rest of "$Na_2O$" in forms that
do not react to produce or
consume $Ca(OH)_2$

C. Potassium compound reactions

Assumptions:

Rxns: (assume all are 90% complete)

$2K_2O_2 + 4H_2O \rightarrow 4KOH + O_2$     2.86624E-05 mol KOH produced/1 g fly ash $4KO_2 + 2H_2O \rightarrow 4KOH + 3O_2$     2.86624E-05 mol KOH produced/1 g fly ash $2KOH + CO_2 \rightarrow K_2CO_3 + H_2O$     2.57962E-05 mol $CO_2$ consumed/1 g fly ash
    0.00113529 g of $CO_2$ consumed/1 g fly ash

D. Magnesium compound reactions

Assumptions:

3.5% by wt of Fly ash is "MgO"
50% of "MgO" is available as Mg     0.000434135 mol Mg/1 g fly ash
50%*.035 g of "MgO" in Mg per 1 g fly ash
1 mol of MgO per mol Mg
molar weight MgO = 40.31 g/mol
Rest of "MgO" in forms that do
not react to produce or consume $Ca(OH)_2$
Rxns: (assume all are 90% complete)

$Mg + 2H_2O \rightarrow Mg(OH)_2 + H_2$     0.000390722 mol $Mg(OH)_2$ produced/1 g fly ash
$Mg(OH)_2 + CO_2 \rightarrow MgCO_3 + H_2O$     0.00035165 mol $CO_2$ consumed/1 g fly ash
    0.015476104 g of $CO_2$ consumed/1 g fly ash E. Total $CO_2$ Consumed (Sequestered) in CLSM 0.020 g of $CO_2$ consumed (sequestered)/g fly ash in Ca reactions
0.009 g of $CO_2$ consumed (sequestered)/g fly ash in Na reactions
0.001 g of $CO_2$ consumed (sequestered)/g fly ash in K reactions
0.015 g of $CO_2$ consumed (sequestered)/g fly ash in Mg reactions
0.045 g of $CO_2$ consumed (sequestered)/g fly ash TOTAL Assumptions:
1275 lb of fly ash/1 yd$^3$ CLSM
Sufficient $CO_2$ and $H_2O$ so that Neither Limit the Reaction
2430 lb of CLSM/1 yd$^3$ CLSM
58 lb of $CO_2$ consumed (sequestered)/yd$^3$ of CLSM
0.024 lb of $CO_2$ consumed (sequestered)/lb of CLSM Thus, the invention provides products and processes that make environmentally beneficial use of the carbon dioxide and fly ash produced as by-products of coal burning power plants. In the process, a foam including a foaming agent and flue gas including carbon dioxide is formed, and the foam is added to a mixture including a cementitious material (e.g., fly ash) and water to form a foamed mixture. Thereafter, the foamed mixture is allowed-to set, preferably to a controlled low-strength material having a compressive strength of 1200 psi or less. The carbon dioxide in the flue gas reacts with hydration products in the controlled low-strength material which in turn sequesters the carbon dioxide.

Although the present invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

INDUSTRIAL APPLICABILITY

The invention relates to a process for sequestering carbon dioxide through the production of lightweight controlled low-strength materials. In one process of the invention, carbon dioxide from the flue gas of a coal combustion chamber is sequestered. In the process, a foam including a foaming agent and the flue gas is formed, and the foam is added to a mixture including a cementitious material (e.g., fly ash) and water to form a foamed mixture. Thereafter, the foamed mixture is allowed to set a controlled low-strength material in which the carbon dioxide is sequestered.

What is claimed is:

1. A process for preparing a controlled low-strength material having a compressive strength of 1200 psi or less, the process comprising:
preparing a mixture including water and a cementitious material;
recovering flue gas from a combustion chamber;
forming a foam including a foaming agent and the flue gas;
mixing the foam into the mixture to form a foamed mixture; and
thereafter allowing the foamed mixture to set to form the controlled low-strength material.

2. The process of claim 1 wherein:
coal is combusted in the combustion chamber.

3. The process of claim 1 wherein:
the flue gas includes carbon dioxide.

4. The process of claim 3 wherein:
during the step of allowing the foamed mixture to set, the carbon dioxide in the flue gas reacts with hydration products in the controlled low-strength material to sequester carbon dioxide.

5. The process of claim 1 wherein:
the controlled low-strength material has a compressive strength of 300 psi or less.

6. The process of claim 1 further comprising:
shaping the foamed mixture into aggregates before allowing the foamed mixture to set.

7. The process of claim 1 further comprising:
subjecting the foamed mixture to a shaping process selected from pelletizing, extruding and briquetting before allowing the foamed mixture to set.

8. The process of claim 1 further comprising:
crushing the controlled low-strength material after the controlled low-strength material has set.

9. The process of claim 8 further comprising:
separating the crushed controlled low-strength material into different particle size fractions.

10. The process of claim 1 wherein:
the step of allowing the foamed mixture to set includes passing a heated fluid through crushed or pelletized foamed mixture.

11. The process of claim 1 wherein:
the cementitious material is fly ash.

12. The process of claim 11 wherein:
the foamed mixture includes 700 to 1700 pounds of fly ash per cubic yard of the foamed mixture and 100 to 900 pounds of water per cubic yard of the foamed mixture.

13. The process of claim 11 wherein:
the foamed mixture includes 1000 to 1400 pounds of fly ash per cubic yard of the foamed mixture and 300 to 700 pounds of water per cubic yard of the foamed mixture.

14. The process of claim 13 wherein:
the foamed mixture includes 1 to 100 cubic feet of foam per cubic yard of the foamed mixture.

15. The process of claim 11 wherein:
the fly ash is ASTM Class C fly ash.

16. The process of claim 1 further comprising:
compressing the flue gas prior to forming the foam, the compressed flue gas being used to expand the foaming agent during the forming of the foam.

17. A process for sequestering carbon dioxide from flue gas emitted from a combustion chamber, the process comprising:
forming a foam including a foaming agent and the flue gas;
mixing the foam with a mixture including a cementitious material to form a foamed mixture; and
allowing the foamed mixture to set.

18. The process of claim 17 wherein:
the mixture sets to a controlled low-strength material having a compressive strength of 1200 psi or less.

19. The process of claim 17 wherein:
the mixture includes water, and
the cementitious material is fly ash.

20. The process of claim 19 wherein:
the fly ash is recovered from flue gas emitted from the combustion chamber.

21. The process of claim 17 further comprising:
compressing the flue gas prior to forming the foam, the compressed flue gas being used to expand the foaming agent during the forming of the foam.

22. A process for sequestering carbon dioxide from a gas including one weight percent or more carbon dioxide, the process comprising:
forming a foam including a foaming agent and the gas;
mixing the foam with a mixture including water and fly ash to form a foamed mixture; and
allowing the foamed mixture to set to a controlled low-strength material having a compressive strength of 1200 psi or less.

23. The process of claim 22 further comprising:
compressing the gas prior to forming the foam, the compressed gas being used to expand the foaming agent during the forming of the foam.

* * * * *